June 23, 1959 R. L. HENRY, JR 2,892,129

ELECTRONIC MODULE MOUNTING DEVICE

Filed July 24, 1953

INVENTOR
ROBERT L. HENRY, JR.

BY [signature] [signature]
ATTORNEYS

United States Patent Office 2,892,129
Patented June 23, 1959

2,892,129

ELECTRONIC MODULE MOUNTING DEVICE

Robert L. Henry, Jr., Silver Spring, Md., assignor to the United States of America as represented by the Secretary of the Navy Application July 24, 1953, Serial No. 370,236

4 Claims. (Cl. 317—101)

(Granted under Title 35, U.S. Code (1952), sec. 266)

This invention relates to improvements in electronic module packaging means and techniques.

It has been discovered that electronic equipment, no matter how complex, may be reduced to various groups of components, logically selected, and the groups formed as electronic modules (see my copending application Serial No. 318,148 filed on Oct. 31, 1952, now Patent No. 2,774,014, issued on December 11, 1956). After fabrication of the modules for a specific device, for example, an F.M. receiver, aircraft nose mounted radar gear for gun control and others, the modules may be mounted on a base, upper, lower or both as disclosed in the referenced application. An object of this invention is to provide an improved mounting device for the modules, standardizing size and shape where desired, and providing for very easy interconnection of modules and electrical as well as mechanical connection between the mounting device and a chassis.

The usual design aim in fabricating electrical equipment is to have wires terminate in a group at one location of the equipment or a component thereof. Due to the nature of the electronic module this design principle is not feasible, since there are too many leads, and they usually have to service components located in all directions from the modules. Accordingly, another object of the invention is to provide an electronic module mounting device by arranging two electrically insulating plates in spaced relation and by special spacers holding them spaced so as to provide a module chamber in which a number of modules may be fitted and held; one or both of the plates being metal clad, whereby circuits may be printed thereon, interconnecting the modules and also connecting the contacts of the modules with the spacers.

A further object of the invention is to provide spacers as described previously, with a second function of establishing electrical communication with other components of the equipment, and mechanically connecting the entire assembly with a chassis or the like.

Other objects and features of importance will become apparent in following the description of the illustrated form of the invention.

Figure 2:
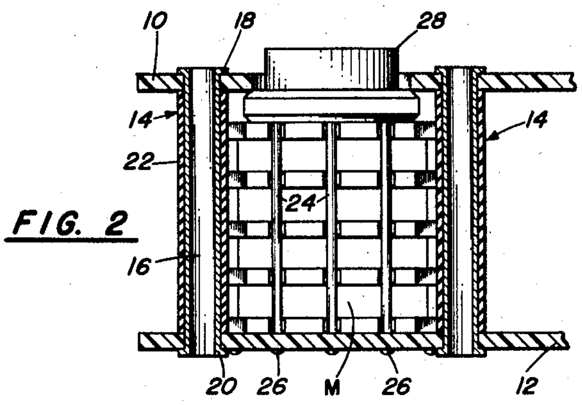
Fig. 2 is a fragmentary longitudinal sectional view of the device, illustrating the placement of one module in it.

In the illustrated form of the invention, the module mounting device is composed of a first and a second plate 10 and 12 respectively, the plates being made of an electrically insulating material, such as a phenolic condensate or other plastic. The plates are held spaced by means of spacers 14, each being of special construction and each preferably being identical. Spacers 14 of Fig. 2 consist of a conductive sleeve 16 with means at its ends to anchor the tube to the plates, as the heads 18 and 20, one or both formed by peening, or other methods used in the manufacture of eyelets. An electrically insulating sleeve 22 is concentric with sleeve 16 and is arranged to hold plates 10 and 12 against movement toward each other, while heads 18 and 20 prevents plates 10 and 12 from moving away from each other.

Figure 1:
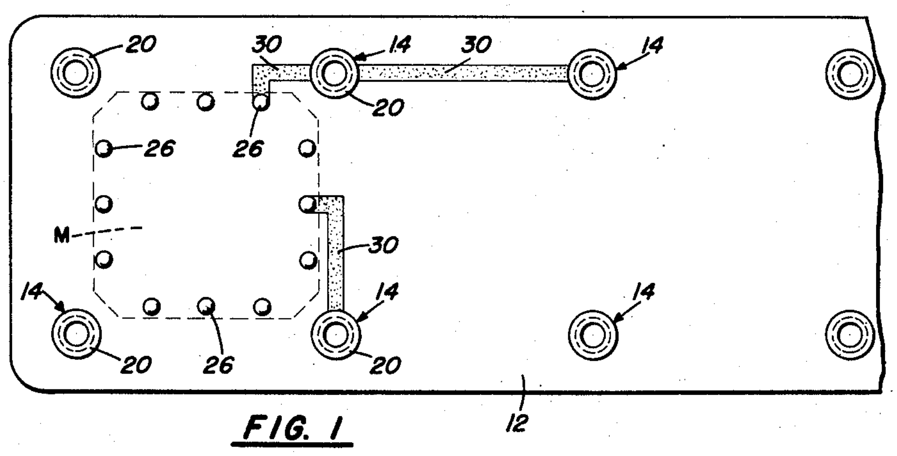
Fig. 1 is a bottom fragmentary view of one form of the mounting device.

It is suggested that the plates 10 and 12 be made of a width to comfortably accommodate a module M, and the length may be varied, depending on the number of modules M to be contained. As seen in Fig. 1, there are spacers at the corners of each module, the reason being to assure that plates 10 and 12 will be held firmly to preserve the module chamber between them, to provide electrical outlets at various locations along and across the device, and to have electrical conductors 16 easily accessible to each module.

*Fabrication and use*

The specific modules to be contained are mounted on plate 12 by passing the ends of risers 24 into holes in plate 12, and then soldering contacts 26 on the ends of the risers that project through plate 12. As described in the application to which reference has been made previously, modules may support various electronic components, and the risers 24 enter into the circuit of the module. In many cases the top wafer of the module will contain a tube socket 28, and plate 10 will be suitably apertured to receive the socket and/or tube.

In a somewhat similar manner, tubes or sleeves 16 enter into the circuit of the mounting and assembling device by being in circuit with one or more of the modules or portions thereof. This is accomplished by having circuit connections 30 printed on, or otherwise carried by, plate 12, plate 10 or both. Such connections may extend from contacts 26 of one module directly to the contacts of another module and/or to one or more of the sleeves 16. The possible connections between modules and from module contacts to spacers 14 are very great in number, and with the spacers located along the length of the device, there need not be any crowding of the conductors at any one place on the device.

After all of the desired modules are fastened to one of the plates, thereby automatically connecting them in a circuit pattern due to the presence of the conductors on the plate, the other plate is connected to the sleeves 16 of spacers 14. This plate also may contain conductors to connect selected spacers, but that would be the unusual application of the device. Now, the device is fabricated and ready to be connected to a chassis, another device or to any other equipment.

Figure 3:
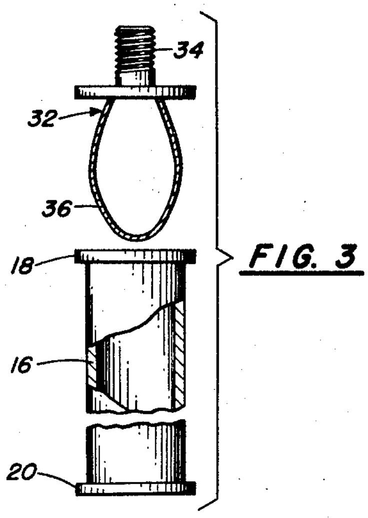
Fig. 3 is an exploded elevational view with parts in section, indicating one means of fastening the device both mechanically and electrically in electronic equipment.

Fig. 3 suggests one manner of attachment to a chassis or the like. The bore of sleeve 16 furnishes a socket in which plug 32 fits. The plug 32 should be fixed, and this may be done by using threaded shank 34 to hold plug 32 stationary. Thus, the leaf spring 36 of plug 32 may be fitted in the bore of sleeve 16, thereby, both mechanically holding sleeve 16 and coming in electrical contact therewith, whereby, circuit patterns including spacers 14 may be continued.

Although one form of the invention is illustrated, various modifications may be made without departing from the scope of the claims. For example, plates 10 and 12 may be made wide enough to contain pairs of modules in side-by-side relation. Also, the electrical circuit patterns may be varied considerably, including the use of sleeve 16 as a shield by grounding it and placing an insulated wire in its bore.

The invention described herein may be manufactured and used by or for the Government of the United States of America for governmental purposes without the payment of any royalties thereon or therefor.

What is claimed is:

1. In electrical apparatus including a plurality of modules comprising electronic components and having contacts thereon, first and second plates, parallel rows of electrically conductive means extending between said plates and providing a plurality of chambers therebetween for housing said modules, one of the conductive means being positioned at each corner of the modules, said means retaining said plates in fixed spaced relation, said plates being of metal clad insulating material having printed circuits thereon, a plurality of apertures through one of said plates, the contacts of said modules extending through the apertures to the opposite side of said one plate, said one plate having at least one electrical conductor extending from one of said apertures to one of the electrically conductive retaining means.

2. In electrical apparatus including at least one module comprising electronic components and having contacts thereon, first and second plates, parallel rows of electrically conductive means extending between said plates and providing a plurality of chambers therebetween for housing said modules, one of the conductive means being positioned at each corner of the modules, said means retaining said plates in fixed spaced relation, said plates being of metal clad insulating material having printed circuits thereon, a plurality of apertures through one of said plates, the contacts of said modules extending through the apertures to the opposite side of said one plate, said one plate having at least one electrical conductor extending from one of said apertures to one of the electrically conductive retaining means.

3. In electrical apparatus including at least one module, said module having a plurality of risers extending from one end thereof, first and second plates, electrically conductive means extending between said plates and providing at least one chamber therebetween for housing said module, a conductive means being positioned at each corner of the module, said means retaining said plates in fixed spaced relation, said plates being of metal clad insulating material having printed circuits thereon, a plurality of apertures through one of said plates, the risers of said module extending through the apertures to the opposite side of said one plate, said one plate having at least one electrical conductor extending from and in electrical contact with one of said risers to one of the electrically conductive retaining means.

4. In electrical apparatus including at least one module; said module having a tube socket mounted on one end and extending outwardly therefrom and a plurality of elongated risers spaced along the periphery of said module extending from said one end along the edges of the module and projecting beyond the other end thereof; first and second plates; electrically conductive means extending between said plates and providing at least one chamber therebetween for housing said module, one of said conductive means being positioned at each corner of the module, said means retaining said plates in fixed spaced relation; said plates being of metal clad insulating material having printed circuits thereon; one of said plates having a plurality of apertures therethrough, the risers of said module extending through the apertures to the opposite side of said one plate, said one plate having at least one electrical conductor extending from and in electrical contact with one of said risers to one of the electrically conductive retaining means; the other of said plates having an aperture receiving said tube socket.

References Cited in the file of this patent

UNITED STATES PATENTS

| | | |
|---|---|---|
| 2,066,511 | Arlt | Jan. 5, 1937 |
| 2,268,619 | Reid | Jan. 6, 1942 |
| 2,312,181 | Matthews | Feb. 23, 1943 |
| 2,474,988 | Sargrove | July 5, 1949 |
| 2,560,320 | Winkler | July 10, 1951 |
| 2,611,010 | Sass et al. | Sept. 16, 1952 |
| 2,764,713 | Alden | Sept. 25, 1956 |
| 2,774,014 | Henry | Dec. 11, 1956 |

FOREIGN PATENTS

| | | |
|---|---|---|
| 539,410 | Germany | Nov. 25, 1931 |